US008254955B2

(12) United States Patent
Nakamura et al.

(10) Patent No.: US 8,254,955 B2
(45) Date of Patent: Aug. 28, 2012

(54) WIRELESS COMMUNICATION SYSTEM AND BASE STATION ACCOMMODATION SERVER

(75) Inventors: Hitomi Nakamura, Kokubunji (JP); Masashi Yano, Kawasaki (JP); Masahiro Takatori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 569 days.

(21) Appl. No.: 12/427,834

(22) Filed: Apr. 22, 2009

(65) Prior Publication Data

US 2009/0270111 A1 Oct. 29, 2009

(30) Foreign Application Priority Data

Apr. 24, 2008 (JP) ................................. 2008-114107

(51) Int. Cl.
*H04W 20/00* (2006.01)
(52) U.S. Cl. .................. 455/456.1; 455/422.1; 455/561; 370/310.2; 370/328
(58) Field of Classification Search ............... 455/422.1, 455/456.1, 561; 370/310.2, 328
See application file for complete search history.

(56) References Cited

U.S. PATENT DOCUMENTS

2008/0298275 A1* 12/2008 De Sousa ....................... 370/255
2010/0069062 A1* 3/2010 Horn et al. ..................... 455/434

OTHER PUBLICATIONS

3GPP TS23.401 v8.0.0, General Packet Radio Service (GPRS) enhancements for Evolved Universal Terrestial Radio Access Network (E-UTRAN) access (Release 8), pp. 46-48 and 65-67, Dec. 2007.

* cited by examiner

*Primary Examiner* — Amancio Gonzalez
(74) *Attorney, Agent, or Firm* — Mattingly & Malur, P.C.

(57) ABSTRACT

A base station accommodation server can appropriately set a location registration area according to an installation location of a femto base station. The base station accommodation server is coupled to a location management server accommodating at least one first base station coupled to a first communication network, and accommodates at least one second base station connected to a second communication network. The base station is configured to determine a location management group identifier of the second base station based on a location management group identifier of the first base station that is present at a location from which the second base station can receive the location management group identifier broadcast by the first base station.

13 Claims, 13 Drawing Sheets

200 FEMTO BASE STATION MANAGEMENT TABLE (FNG26)

| 201 | 202 | 203 | 204 | |
|---|---|---|---|---|
| FEMTO BASE STATION ID | FEMTO LOCATION REGISTRATION AREA ID (MCC-MNC-TAC) | MACRO LOCATION REGISTRATION AREA ID (MCC-MNC-TAC) | CONNECTABLE UE LIST | ... |
| 10000001 | 440-yyy-1110 | 440-xxx-1110 | UE#1, UE#2 | |
| 10000002 | 440-yyy-1112 | 440-xxx-1112 | UE#2, UE#3 | |
| ... | | | | |

*FIG. 3*

220 UE LOCATION MANAGEMENT TABLE (MME24)

| UE ID | MACRO LOCATION REGISTRATION AREA ID (MCC-MNC-TAC) | ... |
|---|---|---|
| UE#1 | 440-xxx-1110 | |
| UE#2 | 440-xxx-1112 | |
| ... | | |

*FIG. 4A*

240 LOCATION REGISTRATION AREA MANAGEMENT TABLE (MME24)

| MACRO LOCATION REGISTRATION AREA ID (MCC-MNC-TAC) | MACRO BASE STATION LIST | FNG LIST | ... |
|---|---|---|---|
| 440-xxx-1110 | MACRO BASE STATIONS #1~#10 | FNG#1, FNG#2 | |
| 440-xxx-1111 | MACRO BASE STATIONS #11~#20 | FNG#1 | |
| ... | | | |

*FIG. 4B*

WIRELESS COMMUNICATION SYSTEM AND BASE STATION ACCOMMODATION SERVER

CLAIM OF PRIORITY

The present application claims priority from Japanese patent application 2008-114107 filed on Apr. 24, 2008, the content of which is hereby incorporated by reference into this application.

BACKGROUND OF THE INVENTION

This invention relates to a wireless communication system in which macrocells and femtocells are used in a mixed manner.

In a cell-based wireless communication system, typified by cell phones, in order to transfer data to a terminal in an idle status (quiescent status), processings called "location registration" and "paging" are performed as is described in, for example, 3GPP TS23.401 v8.0.0, General Packet Radio Service (GPRS) enhancements for Evolved Universal Terrestrial Radio Access Network (E-UTRAN) access (Release 8) pp. 46 to 48, pp. 65 to 67.

The location registration is a processing in which the location of a terminal is registered with a location management server on a location registration area basis. Generally, a location registration area is configured by a plurality of base stations, and each of the base stations broadcasts information regarding its own location registration area to all terminals. The terminal constantly monitors the information regarding the location registration area. Hence, when the information regarding the location registration area, which the terminal is receiving, is changed while the terminal is in motion, the terminal registers the location with the location management server based on the received information regarding the location registration area. With this configuration, the location management server can manage which location registration area each of the terminals is located in. Besides, even when the information regarding the location registration area is not changed, the terminal performs location registration periodically.

Further, the paging is a processing in which a terminal in the idle status is called from the network side and then activated. Upon arrival of data directed to a terminal, the location management server transmits a paging request to all base stations that belong to a location registration area in which the terminal concerned had registered the location thereof last time. Each of the base stations that have received the paging request from the location management server uses a wireless broadcast channel to transfer the paging request to the terminal concerned. Upon reception of the paging request, the terminal concerned activates a wireless channel to thereby start data communication.

As is described above, in the cell-based wireless communication system, the location of the terminal in the idle status is managed on a location registration area basis. Further, when the data has arrived, the terminal is called by all the base stations within the location registration area, and the terminal in the idle status is activated. Then, data transfer to the activated terminal is realized.

The above-mentioned processings of the location registration and the paging are performed via base stations (macrocells, microcells, and picocells) installed by a telecommunications carrier having a radio band license.

On the other hand, a femtocell is a service area that has a coverage area of around several tens of meters, and its applications conceived include expanding the service area to higher floors of a building, which radio waves from a macro base station cannot reach, and improving the communication quality in an ordinary house. The above-mentioned femtocell can be realized by installing a femto base station. In particular, in the case of use in the ordinary house, there is a possibility that an ordinary user who does not have a radio station license installs a femto base station at his/her own discretion.

SUMMARY OF THE INVENTION

A conventional cell phone base station is installed by a telecommunications carrier having the radio band license, and hence the telecommunications carrier can design, in a planned manner, location registration areas that are to be set for the respective base stations (macrocells, microcells, and picocells). However, in the case of installation by the ordinary user, the location registration area of the femto base station cannot be set in advance. Accordingly, in the case where the ordinary user installs a femto base station at his/her own discretion, it is desirable that a location registration area suitable for the installation location of the femto base station be automatically determined in order to reduce management cost on the base station.

Further, the coverage area of a femtocell is narrow, and hence, if a terminal travels in the vicinity of the boundary between a femtocell and a macrocell, the terminal moves across the boundary between the femtocell and the macrocell a number of times. As a result, the location registration occurs frequently. For this reason, in an environment in which femtocells and macrocells are used in a mixed manner, a wireless communication system that reduces the frequency of the location registration is demanded.

It is an object of this invention to appropriately set, when a femto base station is newly installed, the location registration area of a femto base station, and to reduce the frequency of location registration in a case where a terminal moves across the boundary between a femtocell and a macrocell.

A representative aspect of this invention is as follows. That is, there is provided a base station accommodation server that is coupled to a location management server accommodating at least one of a first base station coupled to a first communication network, and accommodates at least one of a second base station connected to a second communication network. The base station determines a location management group identifier of the second base station based on a location management group identifier of the first base station that is present at a location from which the second base station can receive the location management group identifier broadcast by the first base station.

According to an aspect of this invention, it is possible to appropriately set the location registration area according to the installation location of the femto base station, and to reduce the management cost of the base station. Further, it is possible to reduce the frequency of the location registration in the case where the terminal moves across the boundary between the femtocell and the macrocell.

BRIEF DESCRIPTION OF THE DRAWINGS

The present invention can be appreciated by the description which follows in conjunction with the following figures, wherein:

FIG. 3 is a diagram illustrating a structure example of a femto base station management table provided to the FNG in accordance with the embodiments of this invention;

FIG. 4A is a diagram illustrating a structure example of a UE location management table 220 provided to the MME in accordance with the embodiments of this invention;

FIG. 4B is a diagram illustrating a structure example of a location registration area management table provided to the MME in accordance with the embodiments of this invention;

DETAILED DESCRIPTION OF THE PREFERRED EMBODIMENTS

Hereinbelow, with reference to the accompanying drawings, embodiments of this invention are described.

In the embodiments described below, a description is made taking, as an example, Long Term Evolution (LTE) for a 3.9-generation mobile communication system under the 3rd Generation Partnership Project (3GPP), but this invention is not limited thereto, and is applicable to various kinds of wireless communication systems.

First Embodiment

Figure 1:
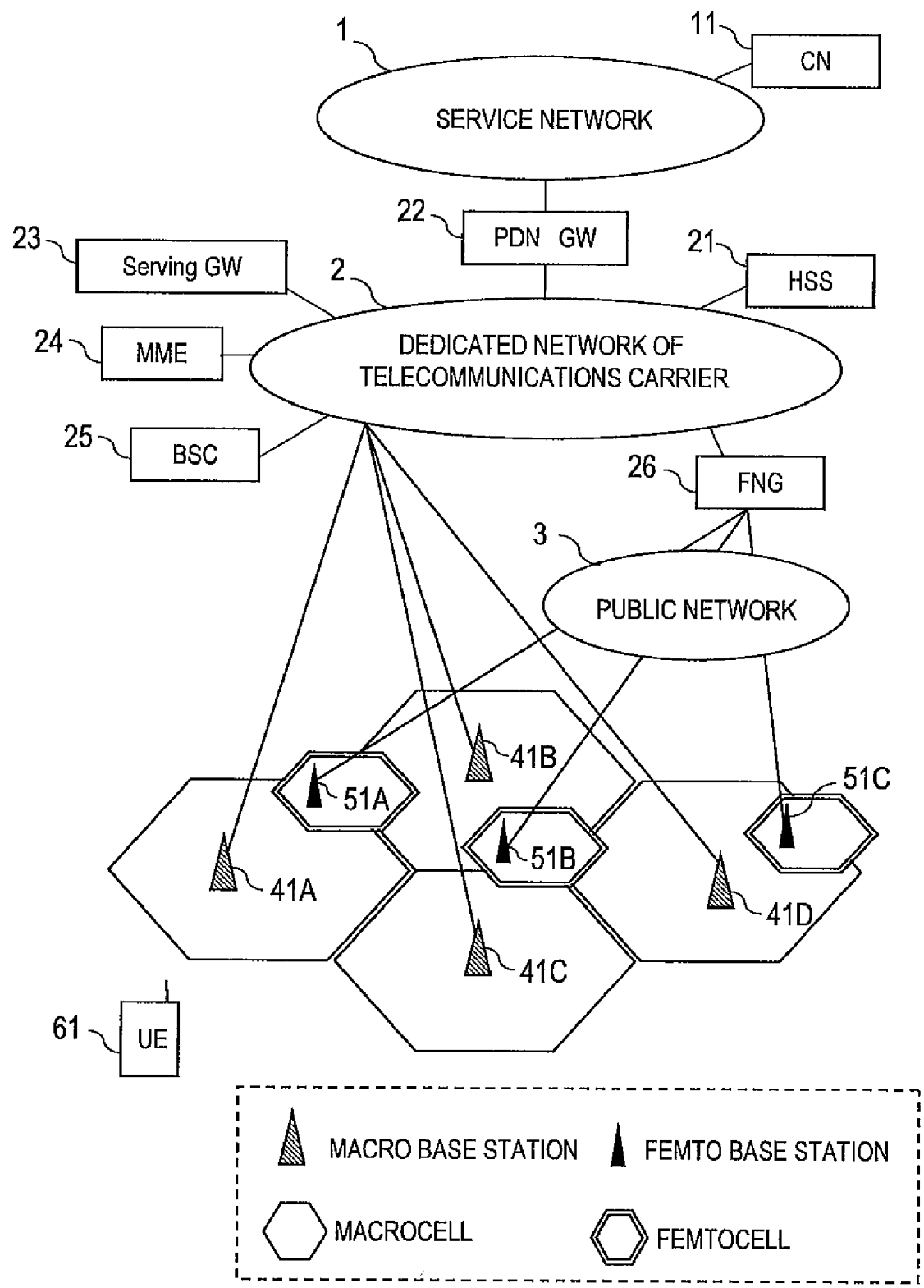
FIG. 1 is a diagram illustrating a configuration example of a communication network in accordance with the embodiments of this invention.

FIG. 1 is a diagram illustrating a configuration example of a communication network according to the embodiments of this invention.

A user equipment (UE) 61 is a user terminal that has a wireless communication function. The UE 61 is capable of connecting to a network of a telecommunications carrier via macro base stations 41A to 41D and femto base stations 51A to 51C.

In this embodiment, the UE 61 performs data communication with a correspondent node (CN) 11 of a service network 1.

The macro base stations 41A to 41D are large-size base stations each having a coverage area with a radius of several kilometers, and are directly accommodated in a dedicated network 2 of the telecommunications carrier by means of dedicated lines. The femto base stations 51A to 51C are small-size base stations having a coverage area with a radius of several tens of meters, and are installed in a random fashion inside and outside the coverage areas of the macro base stations 41A to 41D. The femto base stations 51A to 51C are accommodated in a femto network gateway (FNG) 26 via a public network 3. Then, the femto base stations 51A to 51C are connected to the dedicated network 2 of the telecommunications carrier via the FNG 26. It should be noted that correspondence relation between the FNG 26 that accommodates the femto base stations 51A to 51C and the femto base stations is set in advance, and, based on the correspondence relation, the FNG 26 that accommodates the femto base stations 51A to 51C is determined.

Communications between the femto base stations 51A to 51C and the FNG 26 are performed via the public network 3, and therefore are protected using a security architecture for Internet protocol (IPsec). It should be noted that IPsec is defined in RFC 2401.

A group of devices for performing mobile communication control for a terminal is connected to the dedicated network 2 of the telecommunications carrier.

A Home Subscriber Server (HSS) 21 is a server for managing authentication information and subscriber information between the UE 61 and the femto base stations 51A to 51C. A mobility management entity (MME) 24 is a server for managing a location of the terminal in a unit of location registration area that is configured by a plurality of macro base stations.

The FNG 26 is a device that connects the femto base stations 51A to 51C to the dedicated network 2 of the telecommunications carrier to thereby accommodate each of the femto base stations, and manages connection information of each of the femto base stations.

A Serving gateway (GW) 23 and a packet data network gateway (PDN GW) 22 are devices for transferring user data to the service network 1. The Serving GW 23 is a gateway relevant to a wireless network, whereas the PDN GW 22 is a gateway that is provided on a service network basis.

A base station controller (BSC) 25 is a server that controls allocation of wireless channels for the macro base stations 41A to 41D. It should be noted that the BSC 25 may carry out channel control for the femto base stations 51A to 51C, or alternatively, the FNG 26 or the femto base stations 51A to 51C themselves may carry out the channel control for the femto base stations 51A to 51C. In this embodiment, the femto base stations 51A to 51C carry out the channel control on their own.

Figure 13A:
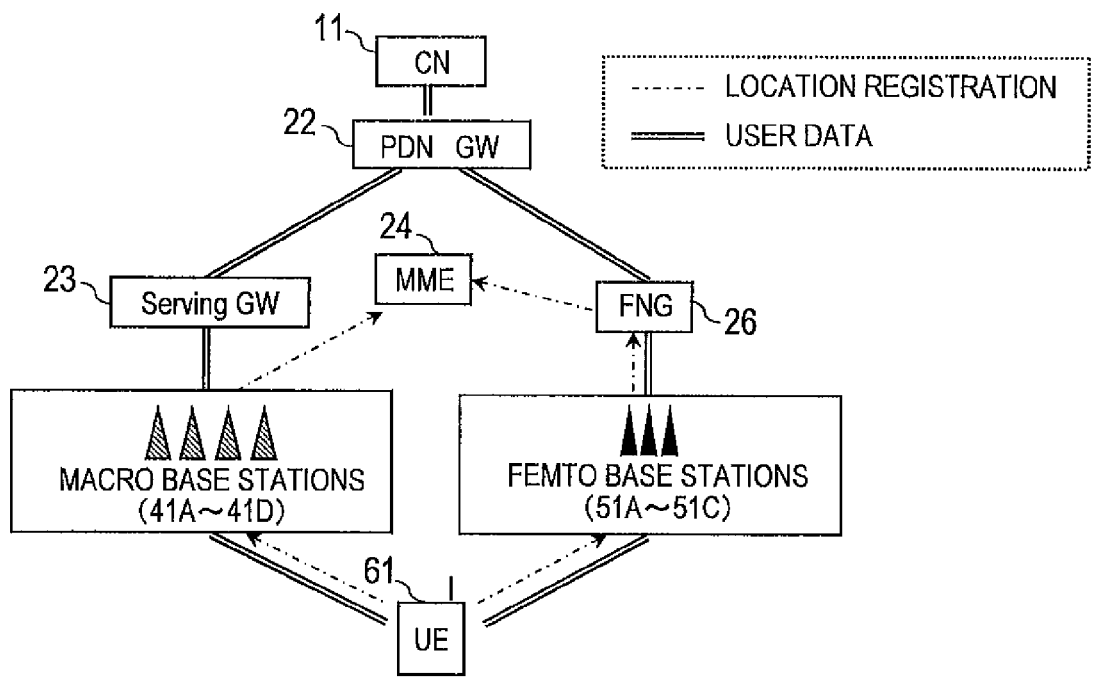
FIG. 13A is a diagram illustrating a logical connection relation in accordance with the first embodiment of this invention.

FIG. 13A is a diagram illustrating a logical connection relation according to the first embodiment of this invention.

In the first embodiment of this invention, when the UE 61 resisters the location via the macro base stations 41A to 41D, a location registration message is transferred from the macro base stations 41A to 41D to the MME 24.

When the UE 61 registers the location via the femto base stations 51A to 51C, the location registration message is transferred from the femto base stations 51A to 51C to the MME 24 via the FNG 26.

Further, when the UE 61 transmits data to the CN 11 via the macro base stations 41A to 41D, the data reaches the CN 11 via the macro base stations 41A to 41D, the Serving GW 23, and the PDN GW 22. When the UE 61 transmits data to the CN 11 via the femto base stations 51A to 51C, the data reaches the CN 11 via the femto base stations 51A to 51C, the FNG 26, and the PDN GW 22.

Figure 2A:
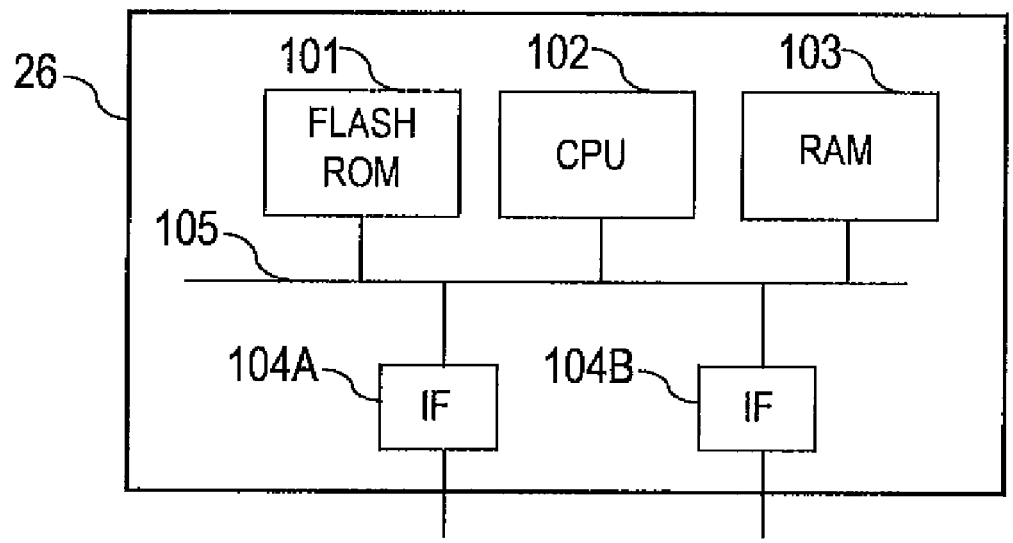
FIG. 2A is a block diagram illustrating a device configuration of an FNG in accordance with the embodiments of this invention.

FIG. 2A is a block diagram illustrating a device configuration of the FNG 26 according to the embodiments of this invention.

The FNG 26 includes a flash ROM 101, a CPU 102, a RAM 103, an interface (IF) 104A, and an IF 104B, which are coupled to one another via a bus 105. Programs for implementing functions of the FNG 26 are stored in the flash ROM 101, and are loaded into the RAM 103 upon activation of the device. The CPU 102 sequentially reads the programs loaded into the RAM 103, and executes the programs.

Figure 2B:
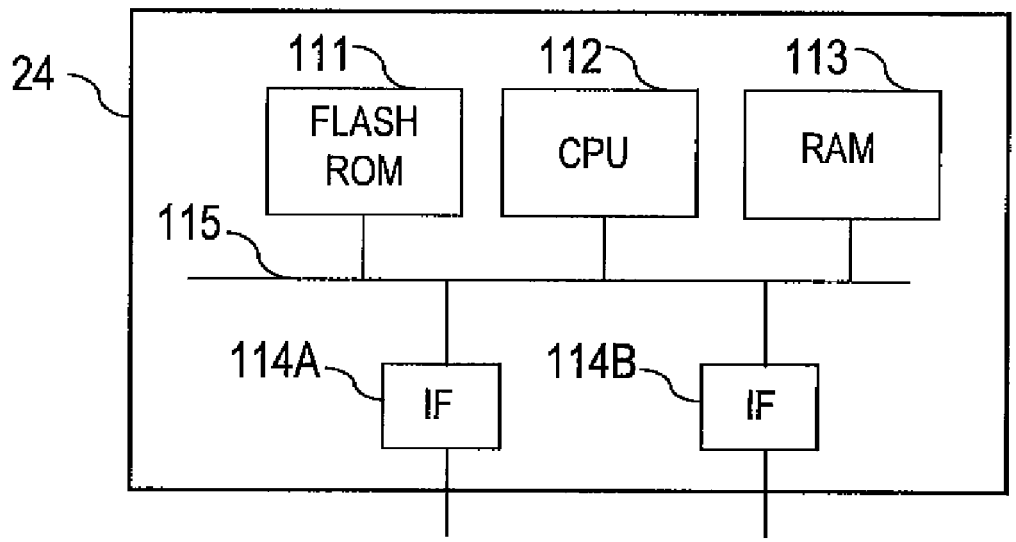
FIG. 2B is a block diagram illustrating a device configuration of an MME in accordance with the embodiments of this invention.

FIG. 2B is a block diagram illustrating a device configuration of the MME 24 according to the embodiments of this invention.

The MME 24 includes a flash ROM 111, a CPU 112, a RAM 113, an IF 114A, and an IF 114B, which are coupled to one another via a bus 115. Programs for implementing functions of the MME 24 are stored in the flash ROM 111, and are loaded into the RAM 113 upon activation of the device. The CPU 112 sequentially reads the programs loaded into the RAM 113, and executes the programs.

FIG. 3 is a diagram illustrating a structure example of a femto base station management table 200 provided to the FNG 26 according to the embodiments of this invention.

The femto base station management table 200 is stored in the RAM 103 of the FNG 26.

The femto base station management table 200 contains a femto base station ID 201, a femto location registration area ID 202, a macro location registration area ID 203, and a connectable UE list 204.

The femto base station ID 201 is an identifier for uniquely identifying the femto base station. It should be noted that the femto base station ID 201 is assigned in advance to the femto base station.

The femto location registration area ID 202 is an identifier of the location registration area, which the femto base station broadcasts.

The macro location registration area ID 203 is an identifier of the location registration area, which a macro base station in the vicinity of the femto base station broadcasts. Here, the macro base station in the vicinity is a macro base station that exists at a location from which the femto base station can receive the identifier of the location registration area, which the macro base station broadcasts. Hereinbelow, the same meaning applies.

In this embodiment, the femto location registration area ID 202 and the macro location registration area ID 203 are set in a form of "mobile country code (MCC)-mobile network code (MNC)-tracking area code (TAC)".

The connectable UE list 204 is a list of UEs that can connect to the femto base station.

FIG. 4A is a diagram illustrating a structure example of a UE location management table 220 provided to the MME 24 according to the embodiments of this invention.

The UE location management table 220 contains a UE ID 221 and a macro location registration area ID 222.

The UE ID 221 is an identifier for uniquely identifying the UE.

The macro location registration area ID 222 is an identifier of the location registration area in which the UE had registered the location last time. It should be noted that the macro location registration area ID 222 is identical to the macro location registration area ID 203 of the femto base station management table 200.

In this embodiment, in a case where the UE 61 performs location registration via the femto base stations 51A to 51C, the FNG 26 converts, using a method described below with reference to FIG. 9, the femto location registration area ID 202 contained in the location registration message into the macro location registration area ID 203, and then transfers the location registration message to the MME 24. With this configuration, only the macro location registration area ID is always registered in the MME 24. Accordingly, only the macro location registration area ID 222 is stored in the UE location management table 220.

FIG. 4B is a diagram illustrating a structure example of a location registration area management table 240 provided to the MME 24 according to the embodiments of this invention.

The location registration area management table 240 contains a macro location registration area ID 241, a macro base station list 242, and an FNG list 243.

The macro location registration area ID 241 is an identifier of the location registration area, which the macro base station broadcasts. It should be noted that the macro location registration area ID 241 is identical to the macro location registration area ID 203 of the femto base station management table 200. Based on the macro location registration area ID 222, the macro location registration area ID 241 of the location registration area management table 240 is retrieved, whereby the macro base station list 242 and the FNG list 243 can be acquired.

The macro base station list 242 is a list of macro base stations that belong to a macro location registration area corresponding to the macro location registration area ID 241.

The FNG list 243 is a list of FNGs accommodating femto base stations that belong to the macro location registration area corresponding to the macro location registration area ID 241.

It should be noted that, in this embodiment, the macro location registration area ID 241 and the macro base station list 242 are statically set at the time of installation of the macro base station, but the FNG list 243 is dynamically set when the femto base stations 51A to 51C are connected to the FNG 26.

Figure 5:
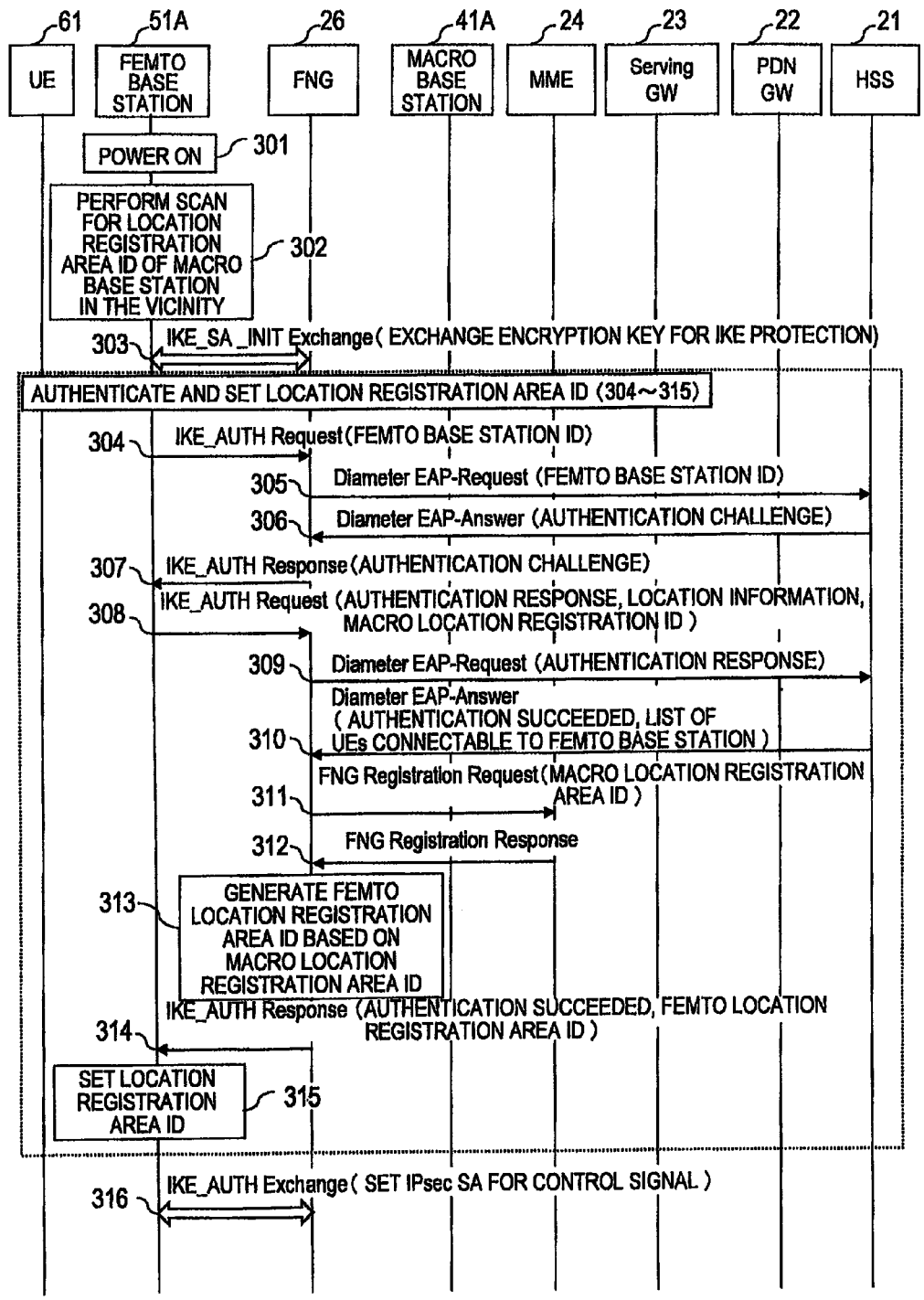
FIG. 5 is a sequence diagram illustrating a call flow in which a femto base station is connected to an FNG after activation in accordance with the embodiments of this invention.

FIG. 5 is a sequence diagram illustrating a call flow in which the femto base station 51A is connected to an FNG 26 after the activation according to the embodiments of this invention.

First, when the femto base station 51A is powered on (301), the femto base station 51A scans radio signals to thereby acquire the identifier of the location registration area of the macro base station 41A located in the vicinity of the femto base station 51A (302). Further, the femto base station 51A searches for an FNG 26 that is to accommodate the femto base station 51A via the public network, and determines the FNG 26 that is to accommodate the femto base station 51A. Then, the femto base station 51A is accommodated by the FNG 26.

Next, the femto base station 51A transmits/receives an IKE_SA_INIT Request/Response of Internet Key Exchange version 2 (IKEv2) to/from the FNG 26 to exchange an encryption key for IKE protection (303). It should be noted that IKEv2 is defined in RFC 4306.

Next, the femto base station 51A transmits an IKE_AUTH Request containing the identifier of the femto base station 51A itself to the FNG 26 (304).

The FNG 26 adds the identifier of the femto base station 51A, which is contained in the received IKE_AUTH Request (304), to a Diameter EAP-Request, and then transmits the Diameter EAP-Request to the HSS 21. Further, the FNG 26 sets the received identifier of the femto base station 51A as the femto base station ID 201 of the femto base station management table 200 (305). It should be noted that the Diameter EAP-Request is defined in RFC 4072.

The HSS 21 that has received the Diameter EAP-Request (305) generates an authentication challenge based on the authentication information of the femto base station 51A, and returns a Diameter EAP-Answer that contains the generated authentication challenge to the FNG 26 (306).

The FNG 26 adds the authentication challenge contained in the received Diameter EAP-Answer (306) to an IKE_AUTH Response, and then transfers the IKE_AUTH Response to the femto base station 51A (307).

The femto base station 51A calculates an authentication response based on the authentication challenge contained in the received IKE_AUTH Response (307). Then, the femto base station 51A adds the authentication response and the identifier of the macro location registration area acquired in Step 302 to an IKE_AUTH Request, and then transmits the IKE_AUTH Request to the FNG 26 (308).

The FNG 26 sets the identifier of the macro location registration area, which is contained in the received IKE_AUTH Request (308), as the macro location registration area ID 203 of the femto base station management table 200, and also adds the authentication response to a Diameter EAP-Request to thereby transmit the Diameter EAP-Request to the HSS 21 (309).

The HSS 21 judges whether or not the authentication response contained in the received Diameter EAP-Request (309) is verified, and then adds, to a Diameter EAP-Answer, an authentication result (in this case, authentication succeeded) and a list of UEs that are connectable to the femto base station 51A to thereby transmit the Diameter EAP-Answer to the FNG 26 (310).

Figure 10:
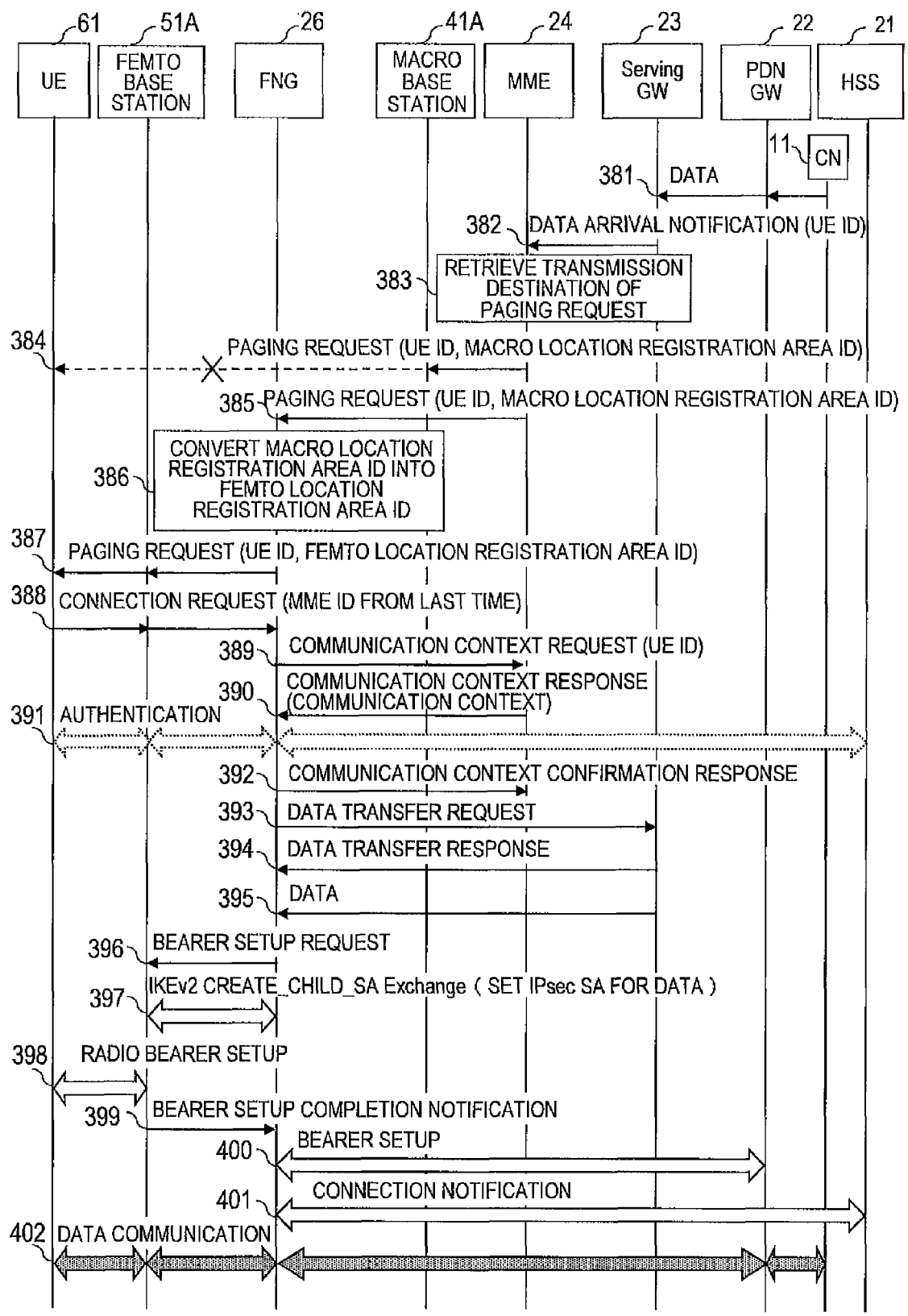
FIG. 10 is a sequence diagram illustrating a call flow in which the UE is paged via the femto base station in accordance with the first embodiment of this invention.

The FNG 26 sets the list of connectable UEs contained in the received Diameter EAP-Answer (310) as the connectable UE list 204 of the femto base station management table 200 of FIG. 3. In this manner, the FNG 26 manages the list of UEs that are connectable to the femto base station, and hence it is possible to reduce a load on paging processing as illustrated in FIG. 10.

Next, the FNG 26 adds, to an FNG Registration Request, the macro location registration area ID 203, which has been set as the macro location registration area ID 203 of the femto base station management table 200 in Step 308, and an FNG ID, and then transmits the FNG Registration Request to the MME 24 (311). It should be noted that the FNG ID is an identifier for uniquely identifying the FNG, and is set in advance in the FNG. The macro location registration area ID 203 and the FNG ID are stored in the MME 24, and hence the MME 24 can manage the macro base station and the FNG in association with each other (in this case, macro base station 41A and FNG 26).

The MME 24 receives the FNG Registration Request (311), and, based on the macro location registration area ID 203 and the FNG ID contained in the received FNG Registration Request, sets the macro location registration area ID 203 and the FNG 26 in association with each other in the location registration area management table 240. After the location registration area management table 240 is set, the MME 24 returns an FNG Registration Response to the FNG 26 (312).

Specifically, the MME 24 sets, in the macro base station list 242 of the location registration area management table 240, all the macro base stations that belong to the macro location registration area corresponding to the macro location registration area ID 241. In addition, the MME 24 sets, in the FNG list 243 of the location registration area management table 240, all the FNGs that belong to the macro location registration area corresponding to the macro location registration area ID 241 based on the received FNG IDs. The MME 24 sets the macro location registration area ID 203 and the FNG ID in association with each other, and hence the MME 24 can manage the macro base station and the FNG in association with each other (in this case, macro base station 41A and FNG 26).

The FNG 26 that has received the FNG Registration Response (312) generates the femto location registration area ID 202 based on the macro location registration area ID 203 received in Step 308 (313). Hereinbelow, with reference to FIG. 6, a detailed description is made of specific processing of generating the femto location registration area ID 202 based on the macro location registration area ID 203.

Figure 6:
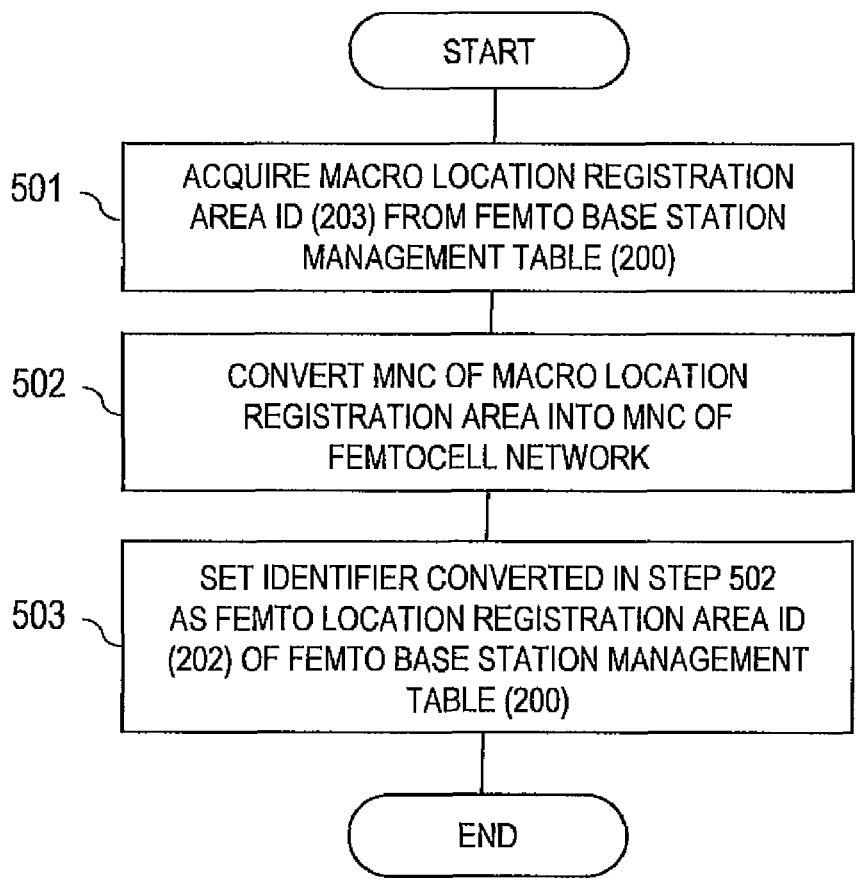
FIG. 6 is a flow chart illustrating a femto location registration area ID generating routine, which is carried out by the FNG in accordance with the embodiments of this invention.

FIG. 6 is a flow chart illustrating a femto location registration area ID generating routine 313, which is carried out by the FNG 26 according to the embodiments of this invention.

First, the FNG 26 acquires the macro location registration area ID 203 from the femto base station management table 200 (501). The macro location registration area ID 203 is set in the femto base station management table 200 of the FNG 26 in Step 308 of FIG. 5.

Next, a mobile network code (MNC) of the macro location registration area ID 203 acquired in Step 501 is converted into an MNC of a femtocell network (502). It should be noted that the MNC of the femtocell network is set in advance in the FNG 26.

Then, the FNG 26 sets the identifier converted in Step 502 in the femto location registration area ID 202 of the femto base station management table 200 (503). With the above-mentioned processing, the femto location registration area ID generating routine 313 is completed.

As described above, the femto location registration area ID 202 is generated by converting only the MNC contained in the macro location registration area ID 203, and hence area information of a macrocell network can be contained in the femto location registration area ID 202.

Figure 8:
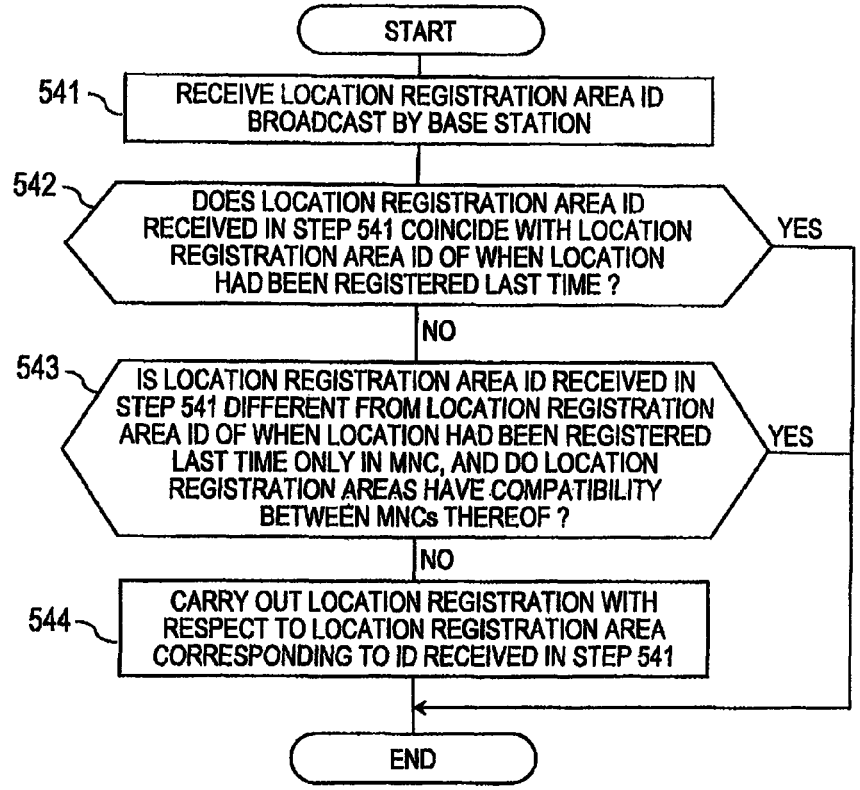
FIG. 8 is a flow chart illustrating a location registration necessity judging routine that is performed by the UE in accordance with the first embodiment of this invention.

In addition, the UE 61 judges whether or not the location registration is necessary using the femto location registration area ID 202 as illustrated in FIG. 8, and hence it is possible to reduce the number of times the location registration is performed when the UE 61 moves across the boundary between a macrocell and a femtocell.

It should be noted that, in the first embodiment of this invention, the MNCs of the macro location registration area ID 203 and the femto location registration area ID 202 are set to be different from each other, but the macro location registration area ID 203 may be used as the femto location registration area ID 202 without any alteration. In such a case, the independence between the macrocell network and the femtocell network is lost, but the processing of judging whether or not the location registration is necessary, which is executed by the UE 61 as illustrated in FIG. 8, can be simplified.

Referring back to FIG. 5, the description of the call flow is continued. The FNG 26 transmits, after Step 313, an IKE_AUTH Response containing an authentication result (authentication succeeded) and the femto location registration area ID 202 to the femto base station 51A (314).

The femto base station 51A sets the femto location registration area ID 202 contained in the received IKE_AUTH Response (314) as an identifier of its own location registration area (315). Subsequently, the femto base station 51A broadcasts the set femto location registration area ID 202 therearound.

Then, the femto base station 51A exchanges an IKE_AUTH Request/Response with the FNG 26, and then sets an IPsec security association (SA: communication path protected with encryption) for transmitting/receiving a control signal (316).

With the processing described above, the call flow for the case in which the femto base station 51A is activated is completed.

Figure 7:
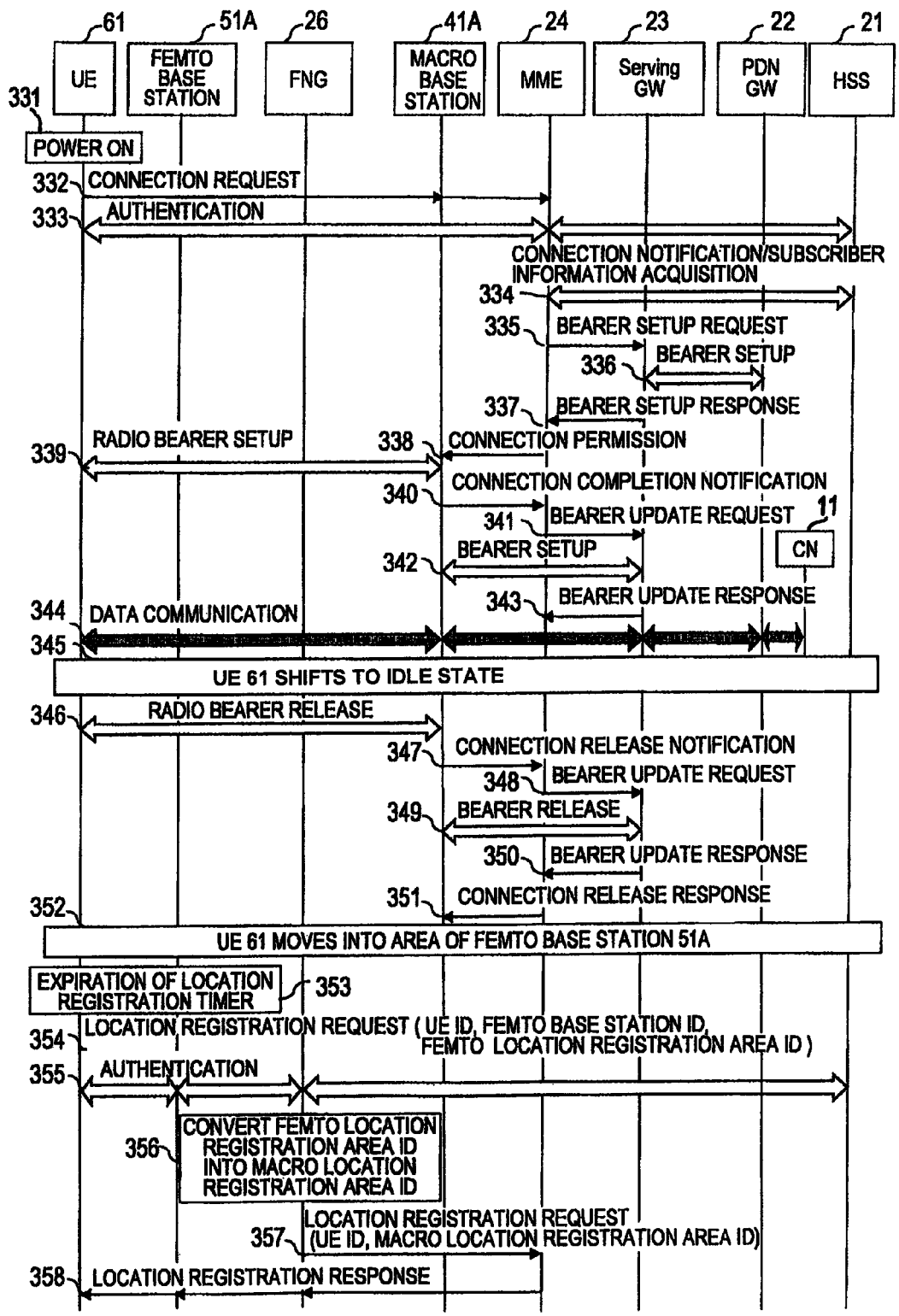
FIG. 7 is a sequence diagram illustrating a call flow in which, after the UE is activated within an area of the macro base station, the UE enters into an idle status, and moves into an area of the femto base station in accordance with a first embodiment of this invention.

FIG. 7 is a sequence diagram illustrating a call flow in which, after the UE 61 is activated within the area of the macro base station 41A, the UE 61 enters into an idle status, and moves into the area of the femto base station 51A according to the first embodiment of this invention.

First, a description is made of processing of activating the UE 61, which corresponds to Steps 331 to 344.

After the power-on (331), the UE 61 scans the radio signals to find a macro base station in the vicinity of the UE 61 (in this case, macro base station 41A), and then transmits a connection request to the macro base station 41A (332).

The connection request (332) is transferred to the MME 24 via the macro base station 41A.

The MME 24 receives the connection request (332), and performs authentication processing with respect to the UE 61 (333). The authentication processing (333) involves the UE 61, the MME 24, and the HSS 21.

When the authentication processing (333) is successful, the MME 24 transmits to the HSS 21 a notification about connection of the UE 61, and then acquires the subscriber information from the HSS 21 (334).

Further, the MME 24 transmits a bearer setup request to the Serving GW 23 (335).

The Serving GW 23 that has received the bearer setup request (335) sets up a bearer (communication path for data transfer) between the PDN GW 22 and the Serving GW 23 (336), and also returns a bearer setup response to the MME 24 (337).

Next, the MME 24 that has received the bearer setup response (337) transmits a connection permission for the UE 61 to the macro base station 41A (338).

The macro base station 41A that has received the connection permission (338) sets up a radio bearer between the UE 61 and the macro base station 41A (339), and also transmits a connection completion notification to the MME 24 (340).

The MME 24 that has received the connection completion notification (340) transmits a bearer update request to the Serving GW 23 (341), and makes a request for a bearer setup between the Serving GW 23 and the macro base station 41A.

The Serving GW 23 that has received the bearer update request (341) sets up a bearer for the macro base station 41A (342), and then returns a bearer update response to the MME 24 (343).

With the processing described above, the processing of activating the UE 61 is completed, and data communication can be performed between the UE 61 and the CN 11 (344).

Next, a description is made of processing from Step 345 to Step 351, in which the UE 61 shifts into the idle status.

After a state in which the UE 61 does not perform communication is continued (345), the radio bearer between the UE 61 and the macro base station 41A is released (346). At this point, the macro base station 41A transmits a connection release notification to the MME 24 (347).

The MME 24 that has received the connection release notification (347) transmits a bearer update request to the Serving GW 23 (348), and makes a request to release the bearer between the Serving GW 23 and the macro base station 41A.

The Serving GW 23 that has received the bearer update request (348) releases the bearer for the macro base station 41A (349), and then returns a bearer update response to the MME 24 (350).

The MME 24 receives the bearer update response (350), and then returns a connection release response to the macro base station 41A (351).

With the processing described above, the processing in which the UE 61 shifts into the idle status is completed.

Next, a description is made of processing from Step 352 to Step 358, in which, after the UE 61 has moved into the area of the femto base station 51A, the UE 61 performs the location registration upon expiration of a location registration timer.

Here, the location registration timer is a timer that is set for the UE 61 to register the location thereof periodically. Upon the expiration of the location registration timer, the UE 61 registers the location, regardless of whether or not the identifier of the location registration area received by the UE 61 has changed.

The UE 61 moves into the area of the femto base station 51A (352). At this time, the UE 61 receives the femto location registration area ID broadcast by the femto base station 51A, and the processing of judging whether or not the location registration is necessary is executed. Hereinbelow, with reference to FIG. 8, a description is made of location registration necessity judging processing performed by the UE 61.

FIG. 8 is a flow chart illustrating a location registration necessity judging routine 540 that is performed by the UE 61 according to the first embodiment of this invention.

First, the UE 61 receives the identifier of the location registration area, which is broadcast by the base station nearby (541).

Next, the UE 61 judges whether or not the received identifier of the location registration area coincides with the identifier of the location registration area of when the location had been registered last time (542). Specifically, the UE 61 refers to the MCC, MNC, and TAC contained in the received identifier of the location registration area, and the MCC, MNC, and TAC contained in the identifier of the location registration area of when the location had been registered last time. Then, in a case where the identifiers are different from each other in at least one of the MCC, the MNC, and the TAC, it is judged that the received identifier of the location registration area is different from the identifier of the location registration area of when the location had been registered last time.

When it is judged that the received identifier of the location registration area coincides with the identifier of the location registration area of when the location had been registered last time, the UE 61 ends the processing without registering the location. When it is judged that the received identifier of the location registration area is different from the identifier of the location registration area of when the location had been registered last time, it is judged whether or not the received identifier of the location registration area is different, only in MNC, from the identifier of the location registration area of when the location had been registered last time, and whether or not the location registration areas have compatibility between the MNCs (543). It should be noted that, in the UE 61, the MNC of the macrocell network and the MNC of the femtocell network, which have the compatibility in location registration area, are registered in advance.

In the above-mentioned judgment, specifically, the MCC, MNC, and TAC contained in the received identifier of the location registration area, and the MCC, MNC, and TAC contained in the identifier of the location registration area of when the location had been registered last time are referred to, and then it is judged whether or not only the MNCs are different from each other. Further, when it is judged that only the MNCs are different from each other, based on information that is registered in the UE 61 in advance and related to the MNC of the macrocell network and the MNC of the femtocell network, which have the compatibility in location registration area, it is judged whether or not there is compatibility between the MNC contained in the received identifier of the location registration area and the MNC contained in the identifier of the location registration area of when the location had been registered last time.

When it is judged that the received identifier of the location registration area is different from the identifier of the location registration area of when the location had been registered last time only in the MNC, and that the MNCs thereof have the compatibility in location registration area, the UE 61 ends the processing without registering the location.

The UE 61 registers the location based on the received identifier of the location registration area (544) in any one of the following cases. They are a case in which it is judged that the received identifier of the location registration area is different from the identifier of the location registration area of when the location had been registered last time in other codes than the MNC, a case in which it is judged that the received identifier of the location registration area is different from the identifier of the location registration area of when the location had been registered last time in another code as well as the MNC, and a case in which it is judged that the received identifier of the location registration area is different from the identifier of the location registration area of when the location had been registered last time only in the MNC, and that the MNCs thereof have no compatibility in location registration area.

With the processing described above, the location registration necessity judging routine 540 executed by the UE 61 is completed.

In this manner, even when the identifier of the location registration area has been changed while the UE 61 is moving, the UE 61 does not register the location in the case where the MNCs contained in the identifiers of the location registration area have the compatibility. As a result, it is possible to reduce the number of times the location is registered, and to decrease the load imposed on the network.

Referring back to FIG. 7, the description of the call flow is continued.

After the UE 61 has moved into the area of the femto base station 51A in Step 352, the above-mentioned location registration necessity judging routine 540 is executed. Here, the femto location registration area ID 202 received from the femto base station 51A is different from the macro location registration area ID 222 of the macro base station 41A of when the location had been registered last time only in the MNC, and the MNCs have the compatibility in location registration area. Hence, the location registration is not performed.

Upon the expiration of the location registration timer (timer for registering location periodically) of the UE 61 soon after the UE 61 has moved out (353), the UE 61 transmits a location registration request to the femto base station 51A, and then, the femto base station 51A transfers the received location registration request to the FNG 26 (354).

The location registration request (354) contains the identifier of the UE 61, the identifier of the femto base station 51A, and the identifier of the femto location registration area, which is broadcast by the femto base station 51A.

The FNG 26 that has received the location registration request (354) starts the authentication processing for the UE 61 (355). The authentication processing (355) involves the UE 61, the femto base station 51A, the FNG 26, and the HSS 21.

When the authentication processing (355) is successful, the FNG 26 converts the identifier of the femto location registration area, which is contained in the location registration request (354), into the identifier of the location registration area of the macro base station (356).

Hereinbelow, referring to FIG. 9, a detailed description is made of processing of converting the location registration area ID, which is performed by the FNG 26.

Figure 9:
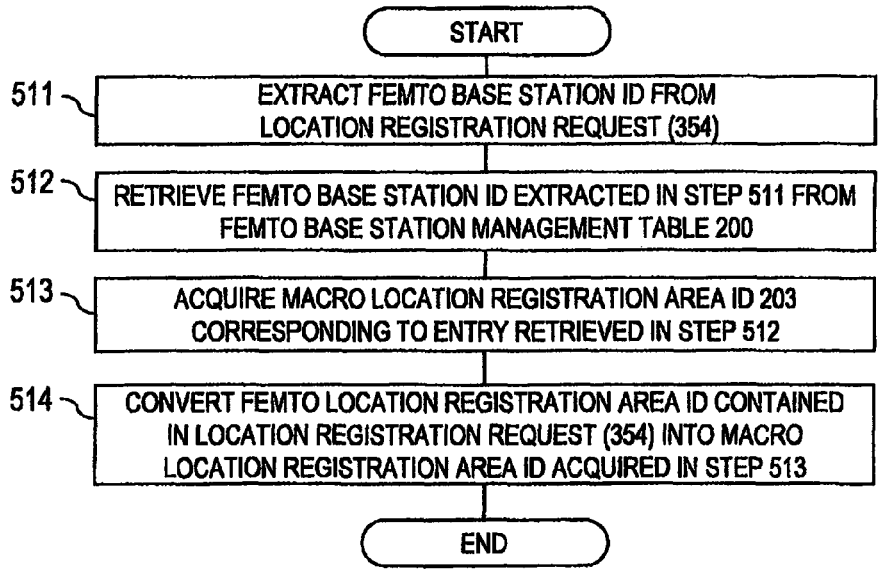
FIG. 9 is a flow chart illustrating a location registration area ID converting routine of the FNG in accordance with the first embodiment of this invention.

FIG. 9 is a flow chart illustrating a location registration area ID converting routine 356 of the FNG 26 according to the first embodiment of this invention.

The FNG 26 first extracts, from the received location registration request (354), the identifier of the femto location registration area of the femto base station 51A (511).

Then, the identifier of the femto location registration area of the femto base station 51A, which has been extracted in Step 511, is retrieved from the femto base station management table 200 (512), and then, the macro location registration area ID 203 of the corresponding entry is acquired (513).

Then, the identifier of the femto location registration area, which is contained in the location registration request (354), is converted into the macro location registration area ID 203 acquired in Step 513 (514), and the processing is ended. Specifically, the MNC contained in the identifier of the femto location registration area, which has been extracted from the location registration request, is converted into the MNC of the macrocell network.

Referring back to FIG. 7, the description of the call flow is continued. After converting the identifier of the femto location registration area, which is contained in the location registration request (354), into the macro location registration area ID 203 in Step 356, the FNG 26 transfers the location registration request to the MME 24 using the macro location registration area ID 203 obtained through the conversion (357). It should be noted that the location registration request contains the identifier of the UE 61 and the above-mentioned macro location registration area ID 203 obtained through the conversion of the location registration area ID converting routine 356.

The MME 24 that has received the location registration request (357) sets the identifier of the UE 61 contained in the location registration request (357) as the UE ID 221 of the UE location management table 220, and sets the macro location registration area ID 203 as the macro location registration area ID 222 of the UE location management table 220, and then returns a location registration response to the FNG 26 (358).

The location registration response (358) is transferred to the UE 61 via the FNG 26 and the femto base station 51A.

With the processing described above, the call flow in which the UE 61 performs the location registration via the femto base station 51A is completed.

FIG. 10 is a sequence diagram illustrating a call flow in which the UE 61 is paged via the femto base station 51A according to the first embodiment of this invention.

First, data that the CN 11 has transmitted for the UE 61 is transferred to the Serving GW 23 via the PDN GW 22 (381).

The Serving GW 23 buffers the data transferred in Step 381, and transmits a data arrival notification to the MME 24 (382). The data arrival notification (382) contains the identifier of a UE that is a destination of the data (ID of UE 61).

Upon reception of the data arrival notification (382), the MME 24 searches for a transmission destination of a paging request. Hereinbelow, referring to FIG. 11A, a description is made of processing of searching for the transmission destination of the paging request.

Figure 11A:
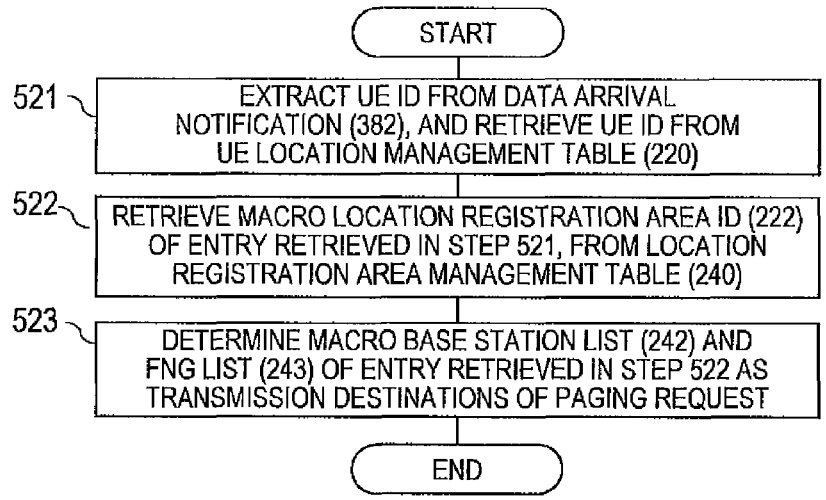
FIG. 11A is a flow chart illustrating a paging request transmission destination searching routine executed by the MME in accordance with the first embodiment of this invention.

FIG. 11A is a flow chart illustrating a paging request transmission destination searching routine 383 executed by the MME 24 according to the first embodiment of this invention.

First, the MME 24 extracts the identifier of the UE from the data arrival notification (382), and then retrieves the extracted identifier of the UE from the UE location management table 220 (521). Specifically, the MME 24 refers to the UE ID 221 of the UE location management table 220, and retrieves an identifier identical to the extracted identifier of the UE.

Next, the MME 24 retrieves the macro location registration area ID 222 of the entry retrieved in Step 521 from the location registration area management table 240 (522). Specifically, the MME 24 refers to the macro location registration area ID 241 of the location registration area management table 240, and retrieves an identifier identical to the macro location registration area ID 222 of the entry retrieved in Step 521.

Then, the MME 24 determines the macro base station list 242 and the FNG list 243 of the entry retrieved in Step 522 as the transmission destinations of the paging request (523).

With the processing described above, the paging request transmission destination searching routine 383 of the MME 24 is completed.

Referring back to FIG. 10, the description of the call flow is continued.

The MME 24 transmits the paging requests (384 and 385) to the destinations (in this embodiment, macro base station 41A and FNG 26) determined in Step 383. The paging requests (384 and 385) each contain the identifier of the UE that is the destination of the data, and the macro location registration area ID 222 of the entry retrieved in Step 521 of FIG. 11A.

The macro base station 41A transfers the paging request (384) that has been received using a broadcast channel in Step 384, but, in this embodiment, a case in which the paging request does not reach the UE 61 is discussed.

Upon reception of the paging request (385), the FNG 26 converts the macro location registration area ID 222 contained in the message into the femto location registration area ID 202 (386), and, based on the femto location registration area ID obtained through the conversion, transfers the paging request to the femto base station 51A (387). It should be noted that the paging request transferred in Step 387 contains the identifier of the UE and the femto location registration area ID 202 obtained through the conversion. Hereinbelow, referring to FIG. 11B, the processing of Steps 386 and 387 is described.

Figure 11B:
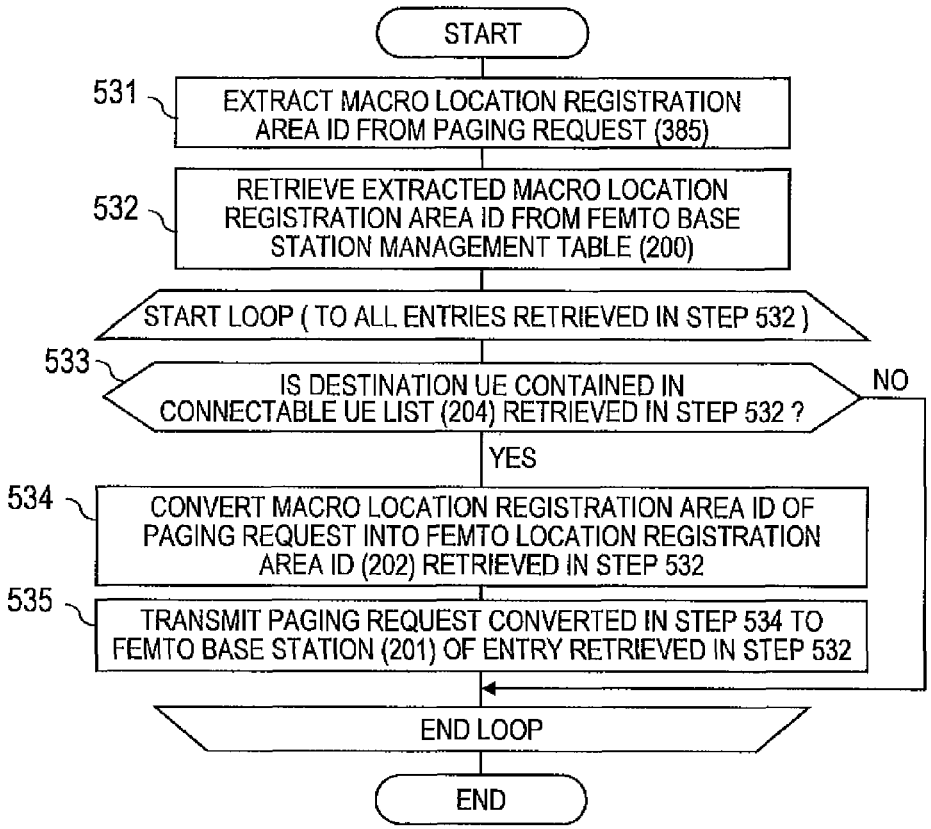
FIG. 11B is a flow chart illustrating a paging request transferring routine executed by the FNG in accordance with the embodiments of this invention.

FIG. 11B is a flow chart illustrating a paging request transferring routine 386, 387 executed by the FNG 26 according to the embodiments of this invention.

First, the FNG 26 extracts from the received paging request (385) the macro location registration area ID 222 (531).

Then, the FNG 26 retrieves the extracted macro location registration area ID 222 from the femto base station management table 200 (532), and then performs the processing from Step 533 to Step 535 to all the corresponding entries.

In Step 533, the FNG 26 judges whether or not the destination UE 61 is contained in the connectable UE list 204 of the entry retrieved in Step 532. Specifically, when the UE 61 is registered in the connectable UE list 204 of the entry retrieved in Step 532, it is judged that the destination UE is contained. When it is judged that the destination UE is not contained in the connectable UE list 204 of the entry retrieved in Step 532, the FNG 26 ends the processing without performing Step 534 and Step 535.

When it is judged that the destination UE is contained in the connectable UE list 204 of the entry retrieved in Step 532, the FNG 26 converts the macro location registration area ID 222 contained in the paging request (385) into the femto location registration area ID 202 of the entry retrieved in Step 532 (534).

Then, the FNG 26 transmits the paging request containing the femto location registration area ID 202 obtained through the conversion in Step 534 to a femto base station corresponding to the femto base station ID 201 of the entry retrieved in Step 532 (535).

With the processing described above, the paging request transferring routine 386, 387 of the FNG 26 is completed.

Referring back to FIG. 10, the description of the call flow is continued.

The paging request (387) transmitted by the FNG 26 is transferred to the UE 61 via the femto base station 51A.

Upon reception of the paging request (387), the UE 61 transmits a connection request to the femto base station 51A (388). The connection request (388) contains the identifier of an MME used when the UE 61 had registered the location last time (in this flow, MME 24). The connection request (388) is transferred from the femto base station 51A to the FNG 26.

Upon reception of the connection request (388), the FNG 26 transmits a communication context request to the MME 24 (389).

The MME 24 that has received the communication context request (389) returns a communication context response to the FNG 26 (390). The communication context response (390) contains a communication context (authentication information, data path information, subscriber information, and the like) of the UE 61.

Next, the FNG 26 that has received the communication context response (390) optionally executes authentication for the UE 61 (391).

When the authentication processing (391) is successful or when the authentication processing (391) is omitted, the FNG 26 transmits a communication context confirmation response to the MME 24 (392) to notify the MME 24 that the migration of the communication context has been completed.

It should be noted that the MME 24 may delete the information on the UE 61 after the reception of the communication context confirmation response (392).

Next, the FNG 26 transmits a data transfer request to the Serving GW 23 (393).

The Serving GW 23 that has received the data transfer request (393) returns a data transfer response to the FNG 26 (394) to transfer the data that has been buffered in Step 381 to the FNG 26.

Next, the FNG 26 that has received the buffered data transmits a bearer setup request to the femto base station 51A (396).

The femto base station 51A that has received the bearer setup request (396) transmits/receives an IKEv2 CREATE_CHILD_SA Request/Response to/from the FNG 26, whereby an IPsec SA for data transfer for the UE 61 is set (397) and a radio bearer is established between the UE 61 and the femto base station 51A (398). Then, the femto base station 51A transmits a bearer setup completion notification to the FNG 26 (399).

Upon reception of the bearer setup completion notification (399), the FNG 26 sets up a bearer between the PDN GW 22 and the FNG 26 (400). At this time, the bearer that is set up between the PDN GW 22 and the Serving GW 23 in Step 336 of FIG. 7 is automatically deleted.

After the setup of the bearer (400), the FNG 26 transmits a connection notification of the UE 61 to the HSS 21 (401).

With the processing described above, the paging processing is completed. Hence, the UE 61 can communicate with the CN 11 via the femto base station 51A, the FNG 26, and the PDN GW 22 (402).

As has been described above, in the first embodiment of this invention, the communication context transfer from the MME 24 to the FNG 26 (389 to 392) and the bearer setup between the PDN GW 22 and the FNG 26 (400) are performed not at the time of the location registration from Step 353 to Step 358 of FIG. 7, but at the time of the paging of FIG. 10.

In this manner, only when the data communication has started, the communication context is transferred, and the path is switched to the path from the PDN GW 22 to the FNG 26, resulting in a decreased load of the paging processing performed by the MME when a terminal in the idle status moves over. Thus, it is possible to decrease the load imposed on the network side.

Figure 12:
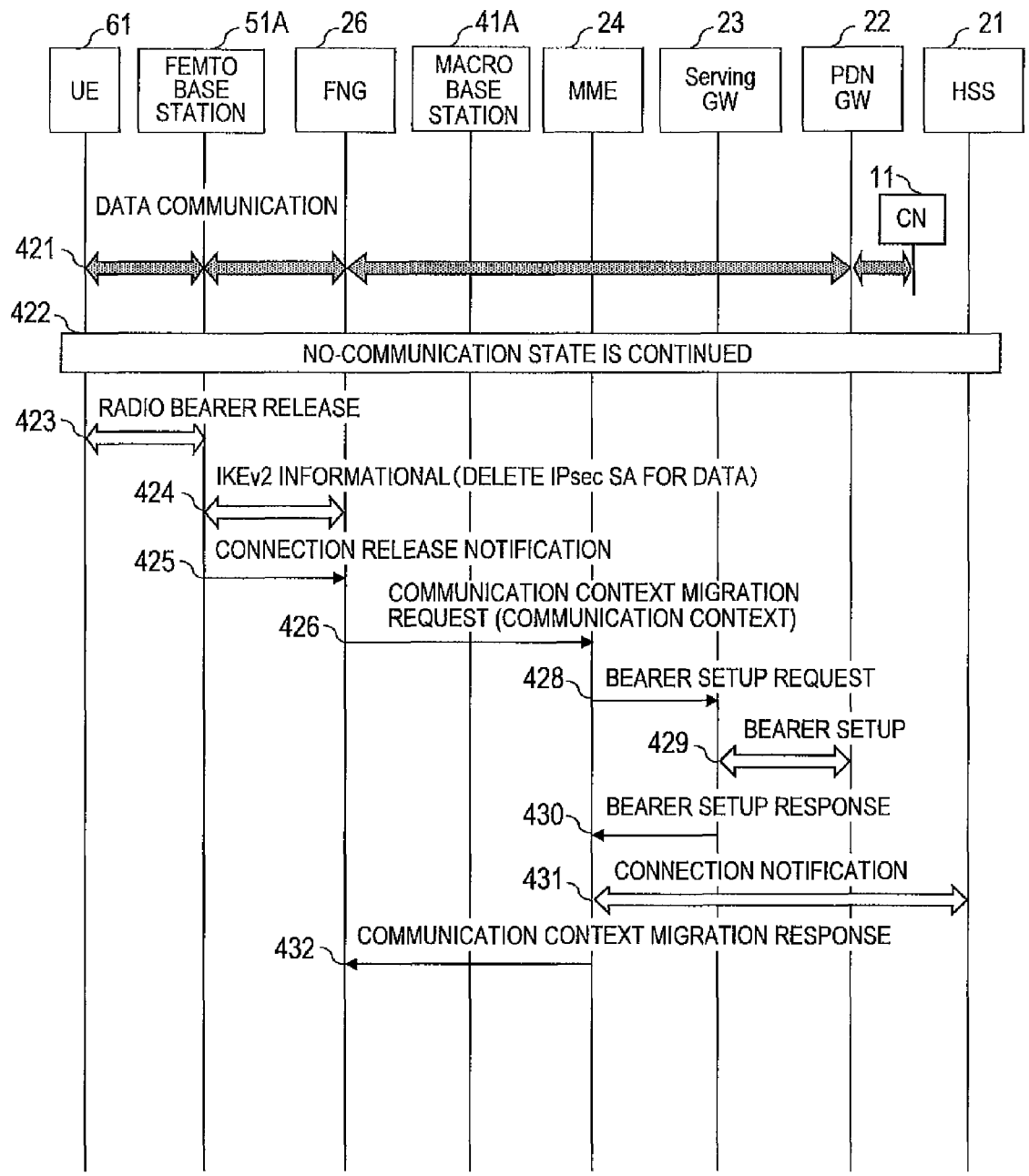
FIG. 12 is a sequence diagram illustrating a call flow in which the UE shifts into an idle status after performing a data communication via the femto base station in accordance with the first embodiment of this invention.

FIG. 12 is a sequence diagram illustrating a call flow in which the UE 61 shifts into the idle status after performing the data communication via the femto base station 51A according to the first embodiment of this invention.

First, the UE 61 performs the data communication with the CN 11 via the femto base station 51A, the FNG 26, and the PDN GW 22 (421).

Subsequently, a state in which the UE 61 does not perform the communication is continued for a given period of time (422), and then the radio bearer between the UE 61 and the femto base station 51A is released (423).

The femto base station 51A that has received the release of the radio bearer (423) exchanges an IKEv2 INFORMATIONAL Request/Response with the FNG 26 (424) to delete the IPsec SA for the data transfer. Then, the femto base station 51A transmits a connection release notification to the FNG 26 (425).

With the reception of the connection release notification (425) as a trigger, the FNG 26 transmits a communication context migration request to the MME 24 (426).

Upon reception of the communication context migration request (426), the MME 24 transmits a bearer setup request to the Serving GW 23 (428).

The Serving GW 23 sets up a bearer for the PDN GW 22 (429), and then returns a bearer setup response to the MME 24 (430). At this time, the bearer that is set up between the PDN GW 22 and the FNG 26 in Step 400 of FIG. 10 is automatically deleted.

Then, the MME 24 transmits a connection notification of the UE 61 to the HSS 21 (431), and also returns a communication context migration response to the FNG 26 (432).

The FNG 26 may delete the information on the UE 61 after the reception of the communication context migration response (432).

With the processing described above, the call flow in which the UE 61 shifts into the idle status within the area of the femto base station 51A is completed.

Here, in this embodiment, immediately after the release of the radio bearer (423), Steps 424 to 432 are executed. However, in view of the possibility that the UE 61 starts the communication again, frequent migration of the communication context between the FNG 26 and the MME 24 results in an increased network load, and hence the execution of the processing from Step 424 to Step 432 may be postponed for a certain period of time.

In the first embodiment of this invention, as illustrated in Steps 426 to 432 of FIG. 12, when the UE 61 has shifted into the idle status, the communication context is migrated from the FNG 26 to the MME 24, and the bearer is set up between the PDN GW 22 and the Serving GW 23. In this manner, the communication context of the terminal in the idle status is managed by the MME 24, and the bearer is set up between the PDN GW 22 and the Serving GW 23. As a result, the paging processing illustrated in FIG. 10 can always be performed without any inconsistency.

Second Embodiment

A second embodiment of this invention employs a communication network having the same configuration as that of the first embodiment of this invention illustrated in FIG. 1, but the user data is transferred using a different path. Hereinbelow, referring to FIG. 13B, a description is made of a logical connection relation according to the second embodiment of this invention.

Figure 13B:
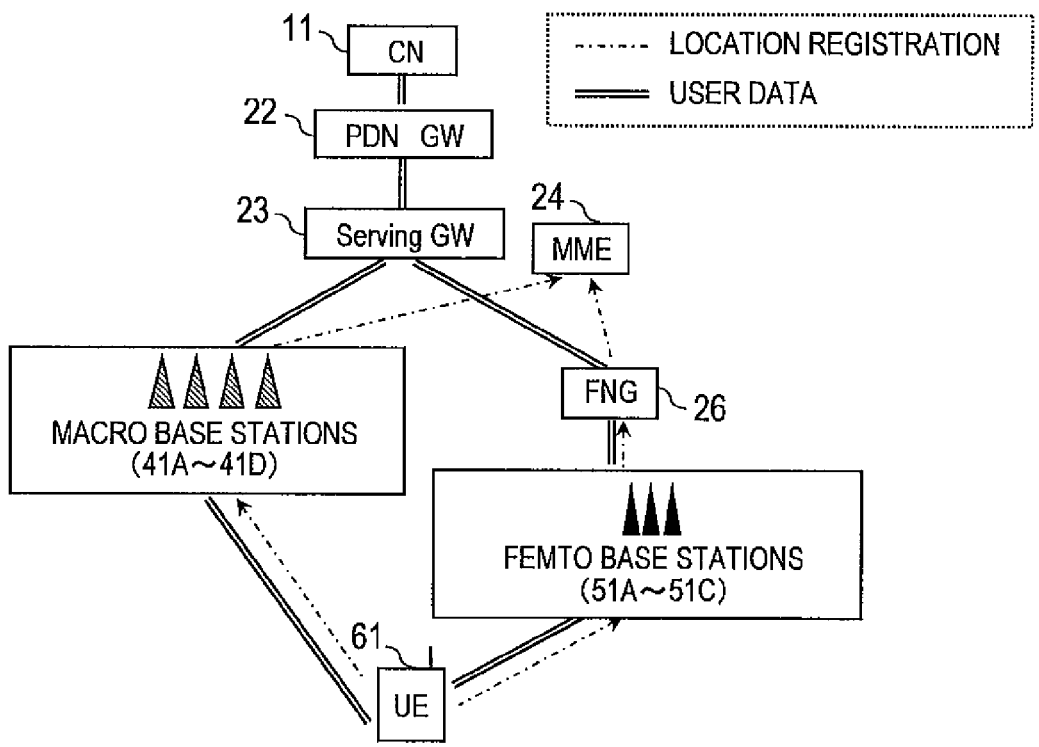
FIG. 13B is a diagram illustrating a logical connection relation in accordance with a second embodiment of this invention.

FIG. 13B is a diagram illustrating the logical connection relation according to the second embodiment of this invention.

As illustrated in FIG. 13B, when the UE 61 performs the location registration via the macro base stations 41A to 41D, the location registration message is transferred from the macro base stations 41A to 41D to the MME 24.

Further, when the UE 61 registers the location via the femto base stations 51A to 51C, the location registration message is transferred from the femto base stations 51A to 51C to the MME 24 via the FNG 26. The migration of data regarding the location registration is the same as the migration illustrated in FIG. 13A according to the first embodiment of this invention.

On the other hand, when the UE 61 transmits data directed to the CN 11 via the macro base stations 41A to 41D, the data reaches the CN 11 via the macro base stations 41A to 41D, the Serving GW 23, and the PDN GW 22.

Further, when the UE 61 transmits data via the femto base stations 51A to 51C, the data reaches the CN 11 via the femto base stations 51A to 51C, the FNG 26, the Serving GW 23, and the PDN GW 22.

The second embodiment of this invention is different from the first embodiment of this invention in that the user data transmitted via the femto base stations 51A to 51C is routed through the Serving GW 23.

Specifically, in the second embodiment of this invention, the FNG 26 accommodates a large number of femto base stations, and is connected to the MME 24 and the Serving GW 23 as one macro base station.

The second embodiment of this invention is different from the first embodiment of this invention only in the path along which the data is transferred, and hence shares the FNG 26 illustrated in FIG. 2A, the MME 24 illustrated in FIG. 2B, the call flow illustrated in FIG. 5, and the call flow illustrated in FIG. 7 with the first embodiment of this invention.

However, with regard to the call flow of FIG. 10 and the call flow of FIG. 12, the data communication is performed via the femto base station, and hence part of the processing is different. Hereinbelow, referring to FIG. 14, a description is made of a call flow corresponding to those of FIGS. 10 and 12.

Figure 14:
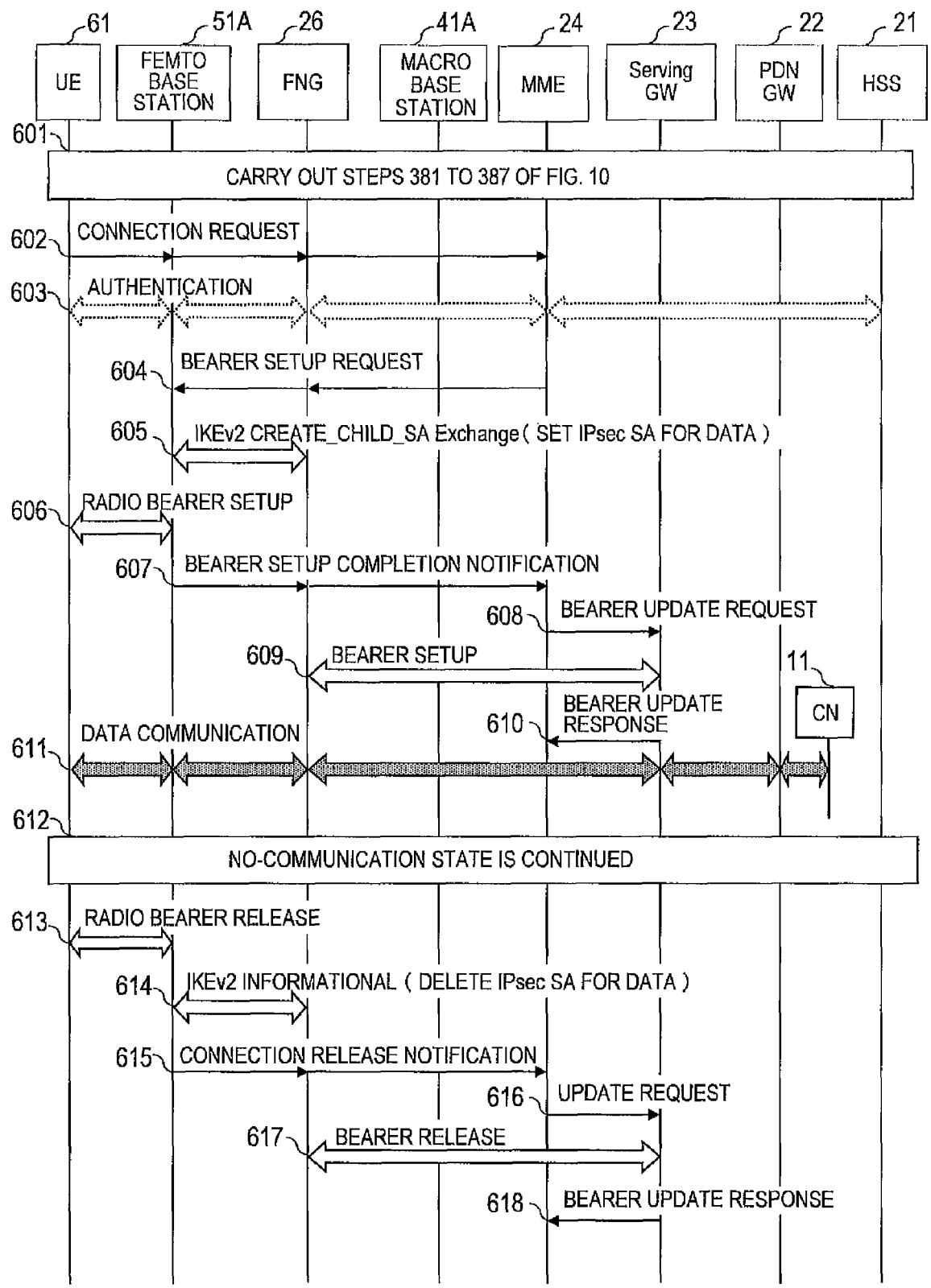
FIG. 14 is a flow chart illustrating a call flow in which, after being paged from the femto base station, the UE shifts into the idle status again in accordance with the second embodiment of this invention.

FIG. 14 is a flow chart illustrating a call flow in which, after being paged from the femto base station 51A, the UE 61 shifts into the idle status again according to the second embodiment of this invention.

First, the processing from Step 381 to Step 387 of FIG. 10 is performed (601). This part is common to the first embodiment of this invention.

Next, the UE 61 transmits a connection request to the femto base station 51A (602). The connection request (602) is transferred to the MME 24 via the femto base station 51A and the FNG 26.

Upon reception of the connection request (602), the MME 24 optionally performs authentication processing for the UE 61 (603). The authentication processing (603) involves the UE 61, the femto base station 51A, the FNG 26, the MME 24, and the HSS 21.

When the authentication processing (603) is successful, or when the authentication processing (603) is omitted, the MME 24 transmits a bearer setup request to the FNG 26 (604). The bearer setup request (604) is transferred from the FNG 26 to the femto base station 51A.

Next, the femto base station 51A that has received the bearer setup request (604) exchanges an IKEv2 CREATE_CHILD_SA Request/Response with the FNG 26 to set an IPsec SA for data communication (605). Then, the femto base station 51A sets up a radio bearer for the UE 61 (606), and transmits a bearer setup completion notification to the FNG 26 (607). The bearer setup completion notification (607) is transferred to the MME 24 via the FNG 26.

The MME 24 that has received the bearer setup completion notification (607) transmits a bearer update request to the Serving GW 23 (608) to make a request to set up a bearer between the Serving GW 23 and the FNG 26.

After setting up a bearer for the FNG 26 (609), the Serving GW 23 returns a bearer update response to the MME 24 (610).

With the processing described above, the paging processing for the UE 61 is completed, and the UE 61 can perform data communication with the CN 11 via the femto base station 51A, the FNG 26, the Serving GW 23, and the PDN GW 22 (611).

Next, the call flow in which the UE 61 shifts into the idle status again is described.

In Step 612, a state in which communication is not performed is continued for a given period of time, and the radio bearer between the UE 61 and the femto base station 51A is released (613).

The femto base station 51A that has received the release of the radio bearer (613) exchanges an IKEv2 INFORMATIONAL Request/Response with the FNG 26 to delete the IPsec SA for data transfer (614). Then, the femto base station 51A transmits a connection release notification to the FNG 26 (615). The connection release notification (615) is transferred from the FNG 26 to the MME 24.

The MME 24 that has received the connection release notification (615) transmits a bearer update request to the Serving GW 23 (616) to make a request to delete the bearer between the Serving GW 23 and the FNG 26.

The Serving GW 23 that has received the bearer update request (616) returns a bearer update response to the MME 24 (618) after deleting the bearer for the FNG 26 (617). With the processing described above, the call flow in which the UE 61 shifts into the idle status is completed.

According to the second embodiment of this invention, the migration of the communication context between the MME 24 and the FNG 26 (Step 390 of FIG. 10 and Step 426 of FIG. 12), the switch to the bearer between the PDN GW 22 and the FNG 26, and the switch to the bearer between the PDN GW 22 and the Serving GW 23 (Step 400 of FIG. 10 and Step 429 of FIG. 12) become unnecessary. Therefore, it is possible to reduce the load on the network side when the UE 61 performs the data communication via the femto base station.

While the present invention has been described in detail and pictorially in the accompanying drawings, the present invention is not limited to such detail but covers various obvious modifications and equivalent arrangements, which fall within the purview of the appended claims.

What is claimed is:

1. A base station accommodation server that is coupled to a location management server accommodating at least one first base station coupled to a first communication network, and accommodates at least one second base station connected to a second communication network,
   wherein the base station accommodation server is configured to determine a location management group identifier of the second base station based on a location management group identifier of the first base station that is present at a location from which the second base station can receive the location management group identifier broadcast by the first base station.

2. The base station accommodation server according to claim 1, being further configured to:
   obtain the location management group identifier received by the second base station; and
   determine the location management group identifier of the second base station based on the obtained location management group identifier.

3. The base station accommodation server according to claim 1, being further configured to determine the location management group identifier of the second base station so as to include part of the location management group identifier of the first base station.

4. The base station accommodation server according to claim 1, comprising a storage unit for storing the location management group identifier of the second base station and the location management group identifier of the first base station in association with each other,
   the base station accommodation server being further configured to:
   receive a request for registering a location of a mobile station from the second base station;
   convert the location management group identifier of the second base station, which is included in the received request, into the location management group identifier of the first base station, which has been received by the second base station; and
   transfer a location registration request which includes the location management group identifier of the first base station obtained through the conversion to the location management server.

5. The base station accommodation server according to claim 1, comprising a storage unit for storing the location management group identifier of the second base station and the location management group identifier of the first base station in association with each other,
   the base station accommodation server being further configured to:
   receive a call request, which is transmitted from the location management server in order to call a mobile station;

convert the location management group identifier of the first base station, which is included in the received call request, into the location management group identifier of the second base station; and transfer, to the second base station, the call request which includes the location management group identifier of the second base station obtained through the conversion.

6. A communication system, comprising:

at least one first base station coupled to a first communication network;

a location management server accommodating the first base station;

at least one second base station coupled to a second communication network; and a base station accommodation server for accommodating the second base station, wherein:

the base station accommodation server is coupled to the location management server;

the first base station and the second base station form a location management group based on installation locations thereof;

the location management server manages a location of a mobile station according to the location management group;

the plurality of first and second base station each broadcast a same location management group identifier by using a radio signal;

the mobile station receives the location management group identifier broadcasted by the first base station, and then transmits a location registration request to the first base station broadcasting the received location management group identifier;

the first base station transfers the received location registration request to the location management server;

the location management server registers the location of the mobile station based on the location management group identifier included in the transferred location registration request;

the mobile station requests the location management server to register the location based on a changed location management group identifier in a case of which the location management group identifier received by the mobile station is changed; and the base station accommodation server determines the location management group identifier of the second base station based on the location management group identifier of the first base station that is present at a location from which the second base station can receive the location management group identifier of the first base station.

7. The communication system according to claim 6, wherein the base station accommodation server is configured to:

obtain the location management group identifier received by the second base station; and determine the location management group identifier of the second base station based on the acquired location management group identifier.

8. The communication system according to claim 6, wherein the base station accommodation server determines the location management group identifier of the second base station so as to include part of the location management group identifier of the first base station.

9. The communication system according to claim 6, wherein the mobile station is configured to:

compare the received location management group identifier of the first base station and the received location management group identifier of second base station in a case of which the mobile station has received the location management group identifier broadcast by the second base station;

prevent from newly registering the location with the location management server in a case of which the location management group identifier of the first base station coincides with the location management group identifier of the second base station; and register the location with the location management server in a case of which the location management group identifier of the first base station is different from the location management group identifier of the second base station.

10. The communication system according to claim 6, wherein:

the base station accommodation server comprises a storage unit for storing the location management group identifier of the second base station and the location management group identifier of the first base station in association with each other; and the base station accommodation server is configured to:

receive a request for registering a location of the mobile station from the second base station;

convert the location management group identifier of the second base station, which is included in the received request, into the location management group identifier of the first base station, which has been received by the second base station; and transfer a location registration request which includes the location management group identifier of the first base station obtained through the conversion to the location management server.

11. The communication system according to claim 6, wherein the location management server transmits, in a case of calling the mobile station, a call request to both the base station accommodation server and the first base station that broadcast the location management group identifier used when the mobile station has registered the location last time.

12. The communication system according to claim 11, wherein:

the location management server comprises a storage unit for storing, in association with one another, the first base station, the location management group identifier of the first base station, and the base station accommodation server accommodating the second base station that belongs to the location management group identical to the location management group of the first base station; and the location management server transfers the call request to the first base station and the base station accommodation server accommodating the second base station that belongs to the location management group identical to the location management group of the first base station.

13. The communication system according to claim 11, wherein:

the base station accommodation server comprises a storage unit for storing the location management group identifier of the second base station and the location management group identifier of the first base station in association with each other; and the base station accommodation server is configured to:

receive the call request, which is transmitted from the location management server in order to call the mobile station;

convert the location management group identifier of the first base station, which is included in the received call request, into the location management group identifier of the second base station; and transfer, to the second base station, the call request which includes the location management group identifier of the second base station obtained through the conversion.

\* \* \* \* \*